I. P. TICE.
Revenue Guard for Stills.
No. 63,336.
Patented March 26, 1867.
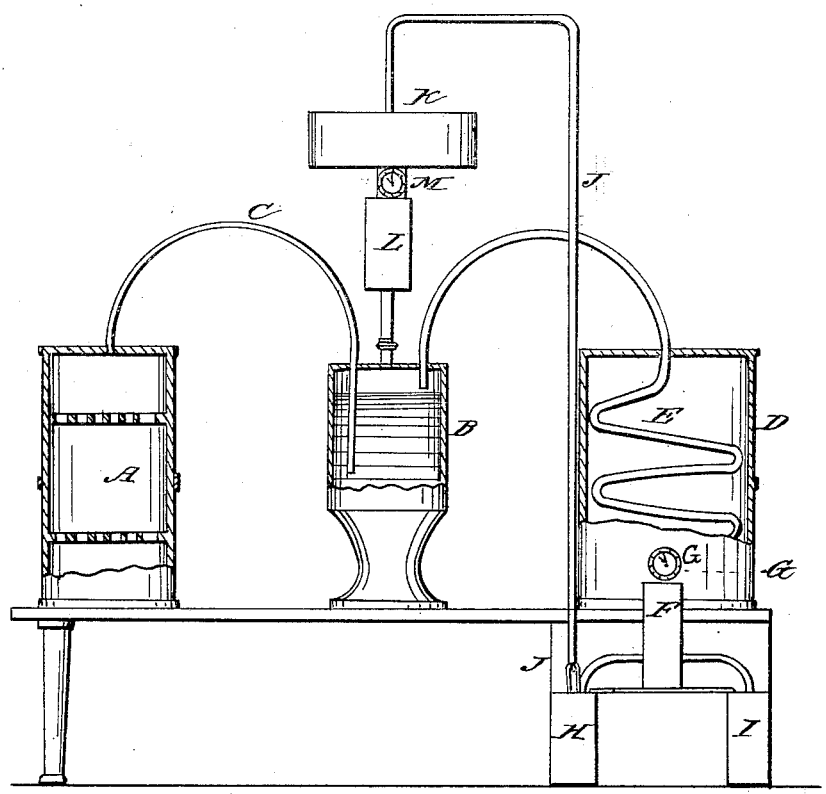

United States Patent Office.

ISAAC P. TICE, OF NEW YORK, N. Y.

Letters Patent No. 63,336, dated March 26, 1867.

IMPROVEMENT IN METER ATTACHMENT FOR STILLS.

*The Schedule referred to in these Letters Patent and making part of the same.*

TO ALL WHOM IT MAY CONCERN:

Be it known that I, ISAAC P. TICE, of the city, county, and State of New York, have invented a new and improved Meter Attachment for Stills; and I do hereby declare that the following is a full, clear, and exact description thereof, which will enable others skilled in the art to make and use the same, reference being had to the accompanying drawing, forming part of this specification.

The drawing represents a sectional elevation of a still with my improvement applied to it.

This invention consists in applying a plurality of meters to a still in such a manner that the amount of low-grade spirits, or that which requires to be redistilled and has passed through the still a second time, will be made known or indicated to a Government official or detective so that the Government cannot be defrauded of revenue by an inaccurate statement of the amount of low spirits, or that below proof, produced by any distillation or series of distillations.

A represents a still; B the "doubler," with which the still A communicates by means of a pipe, C; and D the refrigerator or cold well containing the worm E, which communicates with the "doubler." These parts are in common use, well known, and therefore do not require a special or minute description. F represents a meter, which is connected with the lower or discharge end of the worm E, said meter being provided with an indicator, G, which points out the gross amount of spirits that passes through it. The spirit that passes through the meter F is separated, that is to say, the proof spirits, that which will average 50° from the low spirits, or that of a grade of 20°, or under. At the commencement of the distilling process the product will be high; very frequently it is as high as 80°, and it gradually lowers to 20°, 10°, and even 5°. When the grade reaches 20° the product will not average "proof," which is 50° by hydrometer, and the low spirit is then discharged into another receiver, H, that above 20° being discharged into a receiver, I, and averaging "proof," that is, 50°. This low spirits, therefore, in H requires to be redistilled in order to bring it up to "proof," and to that end it is pumped up by any suitable pumping apparatus, J, into a receiver K, from which it passes through a meter, L, into the "doubler" B. The meter L is provided with an indicator, M, which points out the amount of low spirits that has passed through it.

From the above description it will be seen that the detective or official will have a correct account of the amount of low spirits, or that below proof, which requires to be redistilled; for instance, if the indicator G of the meter F shows that one thousand gallons of spirits have passed through it, and the distiller states that two hundred gallons thereof were low grade, or below 20°, and require to be redistilled, the indicator M of the meter L will prove or falsify the statement; in fact, the indicator M will show the amount redistilled and the precise product of every "mash" indicated to the detective or official. I would remark that the meter L may be applied to the still A, instead of the "doubler," and the same result obtained.

Having thus described my invention, I claim as new, and desire to secure by Letters Patent—

The combination of a plurality of meters with a still, to operate in the manner substantially as and for the purpose herein set forth.

ISAAC P. TICE.

Witnesses:
OCTAVIUS KNIGHT,
JAS. L. EWIN.